Patented June 7, 1938

2,119,521

UNITED STATES PATENT OFFICE 2,119,521

CAST IRON AND THE MANUFACTURE THEREOF

William A. Brown, Connellsville, Pa., assignor, by mesne assignments, to The Carborundum Company, Niagara Falls, N. Y., a corporation of Delaware No Drawing. Application October 10, 1935, Serial No. 44,415

10 Claims. (Cl. 75—44)

This invention relates to the production of cast iron, and more particularly to an improvement in the properties of the melt by the incorporation of silicon carbide as an ingredient.

In my copending application, Serial No. 679,715 for Cast iron and the manufacture thereof, filed July 10, 1933, which has issued as United States Patent No. 2,020,171, I have described and claimed steps to be taken in the production of cast iron according to my invention. The present application is a continuation in part of the aforementioned application, and relates more particularly to the addition material itself.

As set forth in the above identified application, I have found that in the process of producing cast iron, the addition of a relatively small amount of silicon carbide greatly alters the properties of the resulting castings, especially when the original charge contains a high percentage of scrap. Grey cast iron, as is well known, contains a large amount of free graphite, and also a very substantial percentage by volume of other constituents such as iron carbide and iron phosphide. The properties of cast iron depend, to a large extent, upon the relative amount and distribution of these undissolved constituents and particularly upon the proportion and distribution of the free and combined carbon. One of the features of my invention is that it makes possible a very desirable distribution of these constituents and that it affords a stabilized pearlitic structure over widely varying rates of cooling.

A further advantage of my invention is that the addition of the silicon carbide makes possible the melting of the iron and the attainment of high pouring temperatures with the use of a relatively small ratio of coke to metal. When the silicon carbide goes into solution, a vigorous exothermic reaction occurs which increases the pouring temperature of the iron and produces a corresponding increase in the fluidity of the metal and the soundness of the castings. A further advantage of the ability to obtain relatively high pouring temperatures with a reduced ratio of coke to metal is that mixtures of scrap relatively high in sulphur can be remelted without increasing the sulphur content of the iron to a point where it has a deleterious effect upon the structure of the castings.

In using silicon carbide in connection with the cupola melting of iron, I prefer to add the silicon carbide directly to the charge when the latter is introduced into the cupola. I have also found it advantageous to introduce the silicon carbide held in cohesive form by such a binder or cement as to maintain it in the form of lumps or larger until it reaches the slag zone of the cupola.

In carrying out my process, any form of silicon carbide of a reasonable degree of fineness can be employed. For example, I may use dust collector fines, settling tank fines, or finely divided silicon carbide of the type used for refractories. This latter grade of silicon carbide is usually somewhat less pure than that used for abrasives, and is consequently cheaper than the very pure crystalline material. I may also use the material known commercially as "fire sand", which is a product of the silicon carbide furnace and has a silicon carbide content of approximately 85 per cent. Scrap abrasive wheels made from silicon carbide grain can also be used, since the bonds used in making the abrasive will dissolve in the slag, thus permitting the reaction between the silicon carbide and the molten iron. When dust collector fines or settling tank fines are employed, it is in some instances possible to form the material into lumps or briquettes without the use of a temporary binder. A temporary binder is, however, desirable in order to keep the silicon carbide in lump form until it reaches the slag zone of the cupola.

The bonding should be such that the bonded article such as a briquette, will withstand movement with the charge, but any bonding which will prevent disintegration in the slag zone is to be avoided. A temporary binder, such as "Glutrin" or "Lignone" which materials are adhesives made from cellulose sulphite liquor, and are obtained as by-products in the chemical digestion of paper pulp, has been found to fulfill the required conditions, and can be used in a proportion of about one and one-half per cent. Glutrin and Lignone are trade names for cellulose sulphite pitch. I may also use a tar or pitch binder. The latter are better than cellulose sulphite pitch from the point of view of being waterproof and therefore capable of being shipped and stored without protection from the weather; but are difficult to use in shaping the articles such as briquettes, or the like.

The preferred method, however, is to mix the silicon carbide with a wet cement, in proportions to form a wet slurry. I may use as a cement any which forms a pasty mix of the consistency of a slurry, such as Portland cement, Sorel's cement (magnesium oxychloride cement) or hydrated lime. It will be noted that all of the cements mentioned tend to increase the basic character of the slag in the cupola. The use of a wet slurry makes it possible to cast the silicon carbide without the usual danger of destructive abrasion of mold parts or extruding orifices.

In fact, I prefer to cast the mixture of silicon carbide and cement as a wet slurry in a container having partitions of organic material, preferably fibrous partitions such as carton or fiber-board. The wet slurry, when poured into such a container, settles of itself into the cavities or recesses afforded by the partitions. The Portland cement and the Sorel's cement are self setting. The hydrated lime, of course, has this property if left for a sufficient length of time; but as it may be desirable to avoid this time-consuming procedure for setting the hydrated lime, the same may be indurated with carbonic acid gas.

The material cast as a wet slurry between such partitions may be shipped without removing the same from the container. Then when the addition material is to be used in the melting of scrap or the like, the partitions render it an easy matter to divide the mass into sections so that the proper quantity of silicon carbide may be added to the melt.

According to another desirable procedure, the silicon carbide is mixed with a temporary binder and formed into briquettes, and then the briquettes are dipped into a slip or slurry of cement such as Portland cement or Sorel's cement, or into a solution of sodium silicate. The cohesive articles formed as just described are or can be made impervious to the weather. They present a strong outer shell or crust so as to prevent crumbling during movement of the cupola charge. The briquettes having an outer shell of cement or sodium silicate have the advantage that the entire mass is readily disintegrated upon coming into contact with the molten slag. They have the disadvantage that the outer shell or crust must be strong enough to prevent crumbling during movement of the cupola charge, as the greater proportion of the briquette is soft.

As above mentioned, the desired quantity of addition material in the form of briquettes or bricks is thrown into the cupola with the introduction of the charge. When the silicon carbide is properly bonded in the form of briquettes or bricks it remains intact until it reaches the slag zone, whereupon it is disintegrated and the greater part of the silicon carbide apparently goes into solution in the molten iron with a vigorous evolution of heat. There also may be some partial or preliminary solution in the slag, as I have found that proper slagging conditions are of great importance in effecting the solution of the silicon carbide.

In carrying out the melting process, the cupola can be operated in the usual manner, except that it may be desirable to reduce the coke ratio in the charge for the reason above explained. It is desirable to maintain a substantial volume of slag in order to facilitate the solution of the silicon carbide. I have found that with a slag in which the components are preponderantly acid, the solution of silicon carbide is somewhat difficult, but if the composition of the slag is adjusted so that it contains a substantial percentage of basic ingredients, solution of the silicon carbide in the molten bath can be readily effected. A very simple method of maintaining a slag suitable for the dissolution of the silicon carbide lumps or briquettes is to add limestone to the charge. In starting the cupola, a layer of limestone can be placed directly above the coke bed and occasional additions of limestone can be made during the subsequent charging of the cupola. I have found that about fifty (50) pounds of limestone per one thousand (1000) pounds of metal will produce satisfactory slagging conditions.

A slag satisfactory for the disintegration of the silicon carbide briquettes may have the following approximate analysis:

| | Percent |
|---|---|
| $SiO_2$ | 52 |
| FeO | 6 |
| $Al_2O_3$ | 8 |
| CaO | 27 |
| MgO | 5 |
| MnO | 2 |

Other basic materials such as dolomite and magnesite can also be used to provide a proper content of basic oxides in the slag.

The silicon carbide can be distributed through the metal charge, or can be scattered over the layer of limestone placed above the coke. This latter procedure is very desirable, since the dissolution of the silicon carbide takes place in the slag zone, and the metal must pass through the slag during its downward passage through the cupola.

A satisfactory method of operating the cupola comprises laying the coke bed, charging the limestone directly over the coke, scattering about fifteen pounds of silicon carbide in brick or briquetted form over the top surface of the limestone, charging the scrap iron, and then repeating the process with subsequent charges, using first coke and then limestone followed by the silicon carbide and the charge of metal.

I have found it advantageous to add the silicon carbide directly to the charge in the cupola because solution of silicon carbide in the melt is more readily effected than when the addition is made to the metal in the ladle. I have found, however, that in certain instances beneficial effects can be obtained by adding silicon carbide directly to the ladle. In making such additions, I prefer to use the material in briquetted form, for if loose silicon carbide is added to the ladle, the silicon carbide grains lie flat on the surface of the metal or the slag and do not readily dissolve in the molten bath. If desired, the silicon carbide can be introduced below the surface of the metal by means of a small inverted perforated crucible or container forced below the surface of the melt.

I have found that the cohesive articles described and claimed herein are a distinct advantage in the practice of the invention set forth in my copending application above identified. Silicon carbide is so destructive of metal surfaces with which it comes in contact that the manufacturers encounter difficulties in forming the same into bricks or other cohesive masses; and my invention has made it a comparatively easy matter to obtain this addition material in a desired form. Moreover, there is sufficient body or solidity to the product which is obtained in accordance with my invention so that the same, when added as an ingredient in the cupola, remains intact until it reaches the slag zone.

Having thus described my invention, what I claim is:

1. An ingredient for incorporation in the melt used for forming iron castings comprising a mass of silicon carbide and cement set to a cohesive article from a wet slurry.

2. As an article of manufacture a mass of silicon carbide bonded by a cement which has set from a wet slurry, and organic partitions dividing the mass for ready separation into sections.

3. As an article of manufacture, a mixture of silicon carbide and cement, and fibrous partitions subdividing the cemented silicon carbide.

4. As an article of manufacture, a mixture of silicon carbide and bond, and fibrous partitions subdividing the bonded silicon carbide.

5. As an ingredient for incorporation in the melt used for forming iron castings, silicon carbide bonded by Portland cement.

6. An ingredient for incorporation in the melt used for forming iron castings comprising silicon carbide bonded by hydrated lime.

7. An ingredient for incorporation in the melt used for forming iron castings comprising silicon carbide bonded by Sorel's cement.

8. As an ingredient for incorporation in the melt used for forming iron castings, a brick comprising finely divided silicon carbide bonded by Portland cement.

9. In the process of adding silicon carbide to molten iron, the steps which comprise bonding the silicon carbide with Portland cement and adding it so bonded to the charge to be melted.

10. In the process of adding silicon carbide to molten iron, the steps which comprise bonding the silicon carbide into a coherent mass with a cement which sets from a wet slurry, and adding the said bonded mass to the iron during the melting process.

WILLIAM A. BROWN.